(12) United States Patent
Kobayashi

(10) Patent No.: US 8,051,680 B2
(45) Date of Patent: *Nov. 8, 2011

(54) HEATING GLASSMAKING MATERIALS WITH RADIATIVE HEAT TRANSFER

(75) Inventor: Hisashi Kobayashi, Putnam Valley, NY (US)

(73) Assignee: Praxair Technology, Inc., Danbury, CT (US)

( * ) Notice: Subject to any disclaimer, the term of this patent is extended or adjusted under 35 U.S.C. 154(b) by 366 days.

This patent is subject to a terminal disclaimer.

(21) Appl. No.: 12/211,998

(22) Filed: Sep. 17, 2008

(65) Prior Publication Data

US 2009/0084139 A1   Apr. 2, 2009

Related U.S. Application Data

(60) Provisional application No. 60/975,999, filed on Sep. 28, 2007.

(51) Int. Cl.
*C03B 5/00* (2006.01)
*C03B 5/237* (2006.01)
*C03B 1/00* (2006.01)

(52) U.S. Cl. ............... 65/134.6; 65/134.1; 65/136.1

(58) Field of Classification Search ........... 65/134.1, 65/134.6, 136.1
See application file for complete search history.

(56) References Cited

U.S. PATENT DOCUMENTS

| | | | |
|---|---|---|---|
| 3,172,648 A | 3/1965 | Brichard | |
| 3,944,713 A * | 3/1976 | Plumat et al. | 373/34 |
| 4,185,984 A | 1/1980 | Kiyonaga | |
| 4,285,718 A | 8/1981 | Mathias et al. | |
| 4,303,434 A | 12/1981 | Rough, Sr. et al. | |
| 4,306,899 A | 12/1981 | Richards | |
| 4,310,342 A | 1/1982 | Richards | |
| 4,330,315 A | 5/1982 | Nelson et al. | |
| 4,875,919 A | 10/1989 | DeSaro et al. | |
| 5,125,943 A | 6/1992 | Cole | |
| 5,412,882 A | 5/1995 | Zippe et al. | |
| 5,526,580 A | 6/1996 | Zippe et al. | |
| 5,713,977 A | 2/1998 | Kobayashi | |
| 5,807,418 A | 9/1998 | Chamberland et al. | |
| 5,954,851 A | 9/1999 | Sakae | |
| 5,992,041 A | 11/1999 | McClaine et al. | |
| 2007/0227191 A1 * | 10/2007 | Kobayashi et al. | 65/134.4 |
| 2009/0084140 A1 * | 4/2009 | Kobayashi | 65/134.4 |
| 2010/0081103 A1 * | 4/2010 | Kobayashi | 432/1 |
| 2010/0212362 A1 * | 8/2010 | Kobayashi et al. | 65/134.4 |

FOREIGN PATENT DOCUMENTS

| | | |
|---|---|---|
| DE | 33 38 804 A1 | 5/1985 |
| DE | 195 47 186 C1 | 12/1996 |
| EP | 0 995 495 A1 | 4/2000 |
| FR | 2 746 037 | 9/1997 |

OTHER PUBLICATIONS

Tang, J. et al., "Application of Pure Oxygen with Batch Preheating to Glass-Melting Furnaces", Ceramic Bulletin, vol. 69, No. 11 (1990), pp. 1827-1830, Westerville, OH, US.

C.P. Ross et al., "Glass Melting Technology: A Technical and Economic Assessment", Glass Manufacturing Industry Council, Aug. 2004, pp. 73-80.

G. Lubitz et al., "Oxy-fuel Fired Furnace in Combination with Batch and Cullet Preheating", presented at NOVEM Energy Efficiency in Glass Industry Workshop (2000), pp. 69-84.

* cited by examiner

*Primary Examiner* — Matthew Daniels
*Assistant Examiner* — Russell Kemmerle, III
(74) *Attorney, Agent, or Firm* — Donald T. Black

(57) ABSTRACT

Heat in a stream of combustion products obtained from a glassmelting furnace heated by oxy-fuel combustion is passed to incoming glassmaking materials in a heat exchanger without requiring reduction of the temperature of the stream yet without causing softening of the glassmaking material.

10 Claims, 4 Drawing Sheets

HEATING GLASSMAKING MATERIALS WITH RADIATIVE HEAT TRANSFER

CROSS-REFERENCE TO RELATED APPLICATION

The present invention claims priority to U.S. Provisional Patent Application Ser. No. 60/975,999, filed Sep. 28, 2007, the entire contents of which are incorporated herein by reference in its entirety.

FIELD OF THE INVENTION

The present invention relates to the production of glass, and more particularly to the heating of glassmaking material by heat exchange with combustion products (flue gas) formed in the combustion that is carried out to generate heat for melting the glassmaking material.

BACKGROUND OF THE INVENTION

Conventional glassmaking methods require establishing in a glassmelting furnace temperatures that are high enough to melt the glassmaking material (by which is meant one or more materials such as sand, soda ash, limestone, dolomite, feldspar, rouge, which are collectively known as "batch" and/or broken, scrap and recycled glass, known as "cullet"). The required high temperature is generally obtained by combustion of hydrocarbon fuel such as natural gas. The combustion produces gaseous combustion products, also known as flue gas. Even in glassmaking equipment that achieves a relatively high efficiency of heat transfer from the combustion to the glassmaking materials to be melted, the combustion products that exit the melting vessel typically have a temperature well in excess of 2000° F., typically in a range of 2600 to 2950 F, and thus represent a considerable waste of energy that is generated in the glassmaking operations unless that heat energy can be at least partially recovered from the combustion products. The prior art has addressed this problem by using flue gas-to-air heat exchangers known as regenerators. In a conventional air fired regenerative furnace, waste heat in the flue gas is partially recovered in the regenerators by preheating the incoming combustion air and the exit temperature of the flue gas after passing through the regenerators is reduced to about 800 to 1000° F.

Combustion of the hydrocarbon fuel with gaseous oxidant having an oxygen content higher than that of air (which is 20.9 vol. %) (known as "oxy-fuel combustion") provides to the glassmaking operation numerous advantages compared to combustion of the fuel with air. Among those advantages are higher flame temperature and higher available heat without requiring oxidant preheating, which affords higher heat transfer and shorter melting times, and reduced overall volume of the gaseous combustion products that exit the glassmelting furnace, which affords a reduction in the size of the gas-handling equipment that is needed. The combustion products that exit the glassmelting furnace typically have a temperature well in excess of 2000° F., typically in a range of 2500 to 2900 F, and thus represent a considerable waste of energy in spite of its reduced volume. Thus, the gaseous combustion products of oxy-fuel combustion can contain even more heat energy, compared to the large volume combustion products of conventional air-fired combustion with regenerators, which should be used to advantage to improve the overall energy efficiency of the glassmaking operation.

While the glassmaking art is aware of using heat in the hot gaseous combustion products from the glassmelting furnace to preheat incoming glassmaking material which is to be melted in the manufacture of the glass, the heretofore known technology has believed that the temperature of the hot combustion products should not exceed about 1000 to 1300° F. as it commences heat exchange with the glassmaking material. This maximum temperature is imposed by considerations of the capability of the materials from which the heat exchanger is constructed to withstand higher temperatures, and considerations of the tendency of the glassmaking material to begin to soften and become adherent (or "sticky") if it becomes too hot during the heat exchange step, leading to reduced throughput and even plugging of the heat exchanger passages. The temperature at which the glassmaking material becomes adherent or sticky depends on the batch composition and the material in contact with the glassmaking material and is believed to be in a range between 1000 and 1300° F. for a common batch to make soda lime glass for bottles and windows. In a conventional air fired regenerative furnace, the flue gas exit temperature after the regenerators is about 800 to 1000° F. and there is no need to cool down the flue gas prior to a batch/cullet preheater.

When the gaseous combustion products exiting the glassmelting furnace are at high temperatures such as the temperatures obtained by oxy-fuel combustion, the conventional belief has been that they need to be cooled to the range of from 1000 to 1300° F. before heat exchange with the incoming glassmaking materials can commence. Numerous examples exist showing the prior art's belief that the temperature of the flue gas must be reduced before the flue gas is used to heat incoming glassmaking materials. Such examples include C. P. Ross et al., "Glass Melting Technology: A Technical and Economic Assessment", Glass Manufacturing Industry Council, August 2004, pp. 73-80; G. Lubitz et al., "Oxy-fuel Fired Furnace in Combination with Batch and Cullet Preheating", presented at NOVEM Energy Efficiency in Glass Industry Workshop (2000), pp. 69-84; U.S. Pat. No. 5,412,882; U.S. Pat. No. 5,526,580; and U.S. Pat. No. 5,807,418.

However, reducing the temperature of this stream of combustion products by adding to it a gaseous diluent such as air, and/or spraying a cooling liquid such as water into the stream, is disadvantageous as such approaches reduce the amount of recoverable heat remaining in the gaseous combustion products, increase the size of the gas handling equipment that is needed, and adds additional equipment and process expense.

BRIEF SUMMARY OF THE INVENTION

One aspect of the invention is a glassmelting method comprising (A) passing heated glassmaking material into a glassmelting furnace;

(B) combusting fuel with gaseous oxidant having an overall average oxygen content of at least 20.9 vol. % oxygen) to produce heat for melting said heated glassmaking material in said glassmelting furnace and produce hot combustion products having a temperature greater than 1800° F.;

(C) providing a heat exchange unit comprising a lower end, an upper end, and sides enclosing a heat transfer space between said upper and lower ends;

(D) feeding glassmaking material into said heat exchange unit so that said glassmaking material descends along the inner surface of A side of said heat exchange unit;

(E) withdrawing said hot combustion products from said glassmelting furnace and feeding said hot combustion products into said heat exchange unit, wherein the temperature of said hot combustion products entering said heat exchange unit is at least 1800° F., and flowing said hot combustion products through said heat transfer space and out of said heat exchange unit, wherein said hot combustion products heat said glassmaking material in said unit by radiative heat exchange at least part of which is direct radiative heat exchange, wherein said hot combustion products do not contact said glassmaking material within said heat transfer space while they are at a temperature at which the glassmaking material would become adherent if it contacts said hot combustion products, and (F) providing glassmaking material heated in step (E) as the heated glassmaking material that is passed to the furnace in step (A).

As used herein, that glassmaking material is "adherent" means that when 250 grams of the glassmaking material which is in free-flowing particulate form at room temperature is heated to a given temperature in a metal container made of the same material as the barrier that the material is to flow past and is held at that temperature for 30 minutes and the container is then inverted, at least 1% of the material adheres to the surface of the container; and the temperature at which the material "becomes adherent" is the lowest temperature at which the material is thus "adherent" when it is heated to that temperature.

As used herein, "direct" heat transfer means that there is no barrier or other solid object in the path along which the heat flows.

As used herein, "indirect" heat transfer means heat transfer through a barrier that physically separates the material from which and to which heat is being transferred.

DETAILED DESCRIPTION OF THE INVENTION

Figure 1:
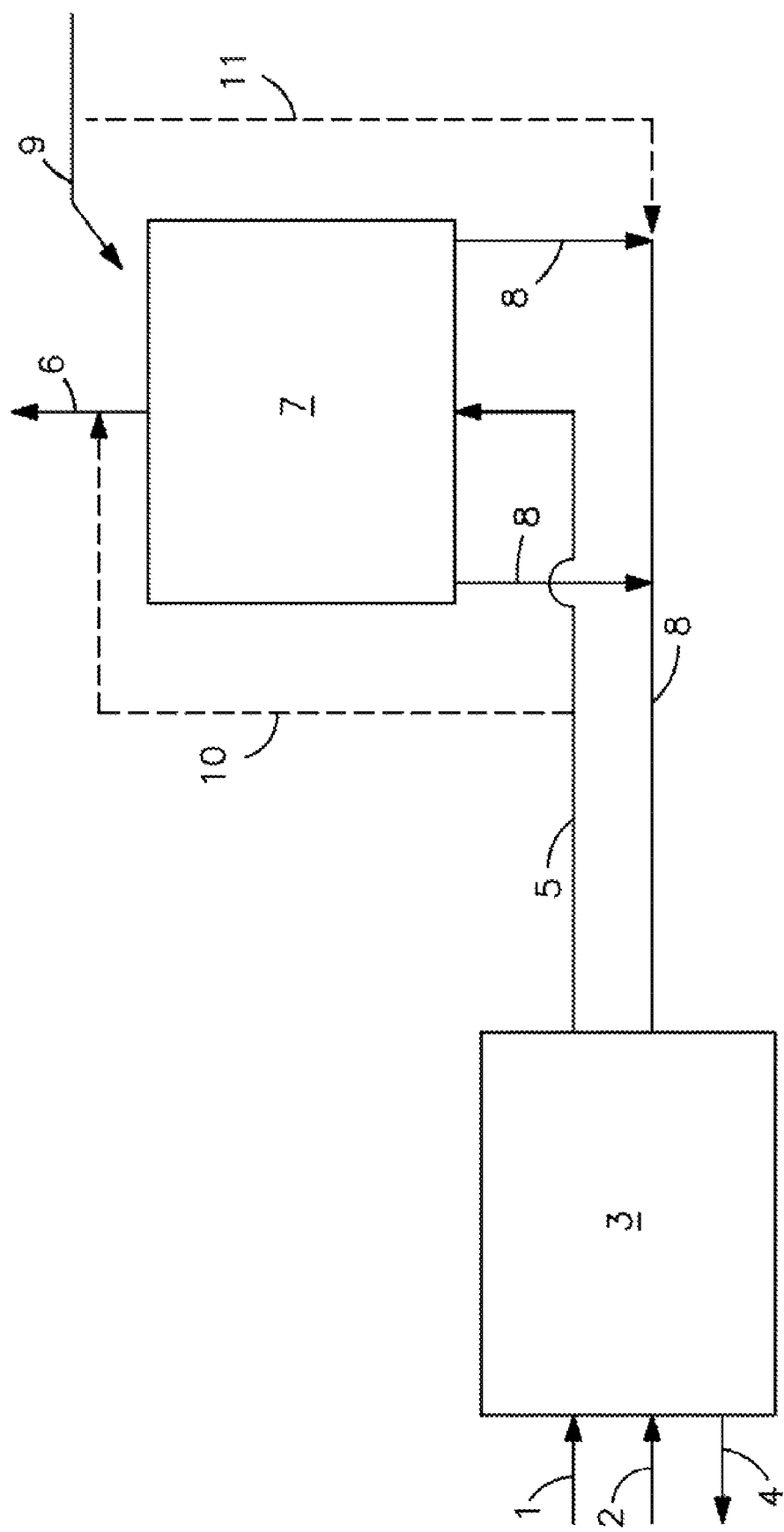
FIG. 1 is a schematic view of glassmaking apparatus with which the method of the present invention can be practiced.

Referring to FIG. 1, fuel stream 1 and gaseous oxidant 2 are fed to glassmelting furnace 3 and combusted therein to generate sufficient heat to melt the glassmaking material present within furnace 3. Stream 4 of molten glass can be recovered from glassmaking furnace 3.

Suitable fuels include any that can be combusted with oxygen to generate the required amount of heat of combustion. Preferred fuels include gaseous hydrocarbons, such as natural gas.

The oxidant depicted as stream 2 can be fed as one stream to a solitary burner within furnace 3, but is more often provided as a plurality of streams to each of several burners within furnace 3. Considered over the aggregate of all such gaseous streams, the overall average oxygen content of all streams fed to and combusted in furnace 3 is at least that of air and is preferably at least 35 volume percent oxygen, and more preferably at least 50 and even at least 90 volume percent oxygen. That is, the oxygen contents of the oxidant streams fed to different burners may differ from one another, for instance if the operator desires to have some burners (to which a higher oxygen content is fed) burn hotter than other burners.

The preferred manner of obtaining a gaseous oxidant stream containing a desired oxygen content is to mix air and a gas having an oxygen content higher than that of air (such as a stream of 90 volume percent oxygen) either upstream from a particular burner or at the burner outlets.

Combustion of the fuel and oxidant produces stream 5 of hot gaseous combustion products which is removed from furnace 3 and fed to heat exchange unit 7, which is described further hereinbelow, from which stream 6 of cooled gaseous combustion products emerges. Optional bypass stream 10 carries hot combustion products from stream 5 to join exit stream 6 without passing through heat exchange unit 7. Bypassing of a portion of stream 5 is typically required for air fired furnaces or partially oxy-fuel fired furnaces where the volume and the waste heat available in hot combustion products far exceed the amount of heat that can be absorbed by preheating glassmaking material to the maximum preheat temperature limited by stickiness problems of certain batch ingredients. Even for oxy-fuel fired furnaces using relatively high purity oxygen of 90% $O_2$ or greater, partial bypassing of stream 5 may be required, depending on the furnace size and operating conditions, to control the temperature in heat exchanger unit 7. For example, a representative temperature of heat exchanger unit 7 can be monitored by one of more thermocouples placed in the interior of unit 7. The flow rate of bypass stream 10 can be adjusted by a damper (not shown) in stream 5 and another damper (not shown) in stream 12. Thus, it is possible to control the temperature of unit 7 by adjusting the flow rate of bypass stream 10 as the operating conditions of a glass melting furnace changes and the feed rate of glassmaking material to heat exchanger unit 7 changes.

Stream 8 of heated glassmaking material to be fed to furnace 3 and melted in furnace 3 is obtained by passing glassmaking material fed as stream 9 through heat exchange unit 7. Optional bypass stream 11 denotes glassmaking material that is combined with heated glassmaking material in stream 8, to be fed also to furnace 3, but which is not passed through heat exchange unit 7. For example only cullet can be fed through heat exchanger unit 7 as stream 9 and combine unheated batch material as bypass stream 11 to form stream 8. Stream 9 and optional stream 11 typically receive the glassmaking material from suitable bins and feeders of conventional design. In a preferred embodiment, the glassmaking material that is fed as stream 9 into heat transfer space 21 (as described below) is material (including a single substance or a mixture of substances) that becomes adherent at 1200° F. or higher, or even at 2000° F. or higher. Silica sand is such material. Then, if desired, the glassmaking material that is fed in bypass stream 11 and is not heated in unit 7 is material (including a single substance or a mixture of substances) that becomes adherent at a temperature below 1200° F., such as material containing niter and/or boron compound(s) used in manufacturing borosilicate glass. The materials that are not heated in unit 7 can optionally be heated without passing through space 21, provided that the material is not heated to a point at which it becomes adherent. When optional stream 11 is used, a mixing device (not shown) is normally required to combine and mix stream 11 into stream 8 and to achieve adequate homogeneity of glassmaking material before it is fed to furnace 3.

Stream 9 can, as indicated above, be obtained from a storage bin or similar apparatus which provides the glassmaking material, or it can be obtained as a stream of heated material exiting another heat exchange unit in which the glassmaking material is preliminarily heated, for instance by heat exchange with hot combustion products such as stream 6.

Figure 2:
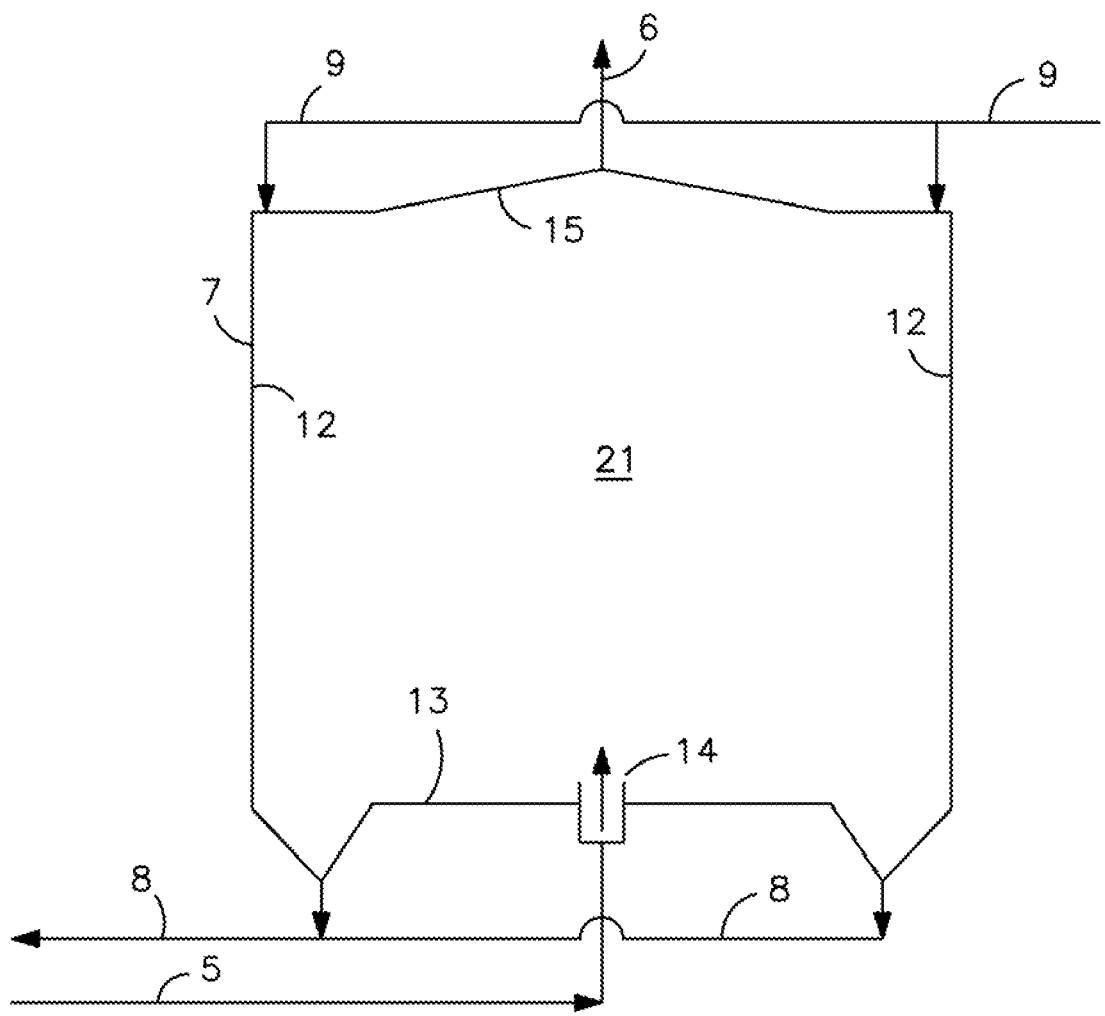
FIG. 2 is a cross-sectional view of a heat exchange unit useful in the practice of the present invention.

FIG. 2 illustrates one preferred embodiment of heat exchange unit 7. Heat transfer space 21 is defined by lower end 13, upper end 15, and wall 12. Heat exchange unit 7 can have a horizontal cross-sectional shape which is circular, rectangular, or any other geometric configuration, although circular and rectangular, particularly square, are preferred. Thus, wall 12 can be one continuous piece, or can comprise several sides which taken together form wall 12.

Stream 5 of hot combustion products from the glassmelting furnace is fed through one or more inlet nozzles 14 in the lower end 13 of unit 7 into space 21. Advantageously, stream 5 is conveyed to the heat exchange unit 7 in a pipe that has a suitable heat-resistant refractory interior lining that can withstand the high temperature of this stream. Stream 5 as it enters space 21 is at a temperature of at least 1800° F. and may be over 2000° F. or even over 2200° F. and as high as 3000 F. Thus, one advantage of the practice of the present invention is that it can be carried out without requiring any significant reduction in the temperature of the hot combustion products before beginning to transfer heat from the hot combustion products to the glassmaking material. Significantly, no addition of dilution air or other cooling media to stream 5, between the glassmelting furnace and unit 7, is necessary.

Referring again to FIG. 2, stream 9 of incoming glassmaking material to be heated is fed to the upper end 15 of unit 7. Stream 9 is fed to one or more locations so that glassmaking material descends along the inner surface of wall 12. The glassmaking material is fed into space 21 at a rate such that it descends without overflowing at the top of unit 7. The wall 12 can be vertical or can slope such that the distance across space 21 closer to the upper end is larger than the distance across space 21 closer to the lower end. The glassmaking material is fed from above the inner surface of wall 12, near the inner surface. When baffles protruding into space 21 are in place as described below, the glassmaking material is preferably fed close enough to wall 12 so that it contacts the baffles as it descends. The baffles are preferably configured and arranged so as to confine the descending glassmaking material near wall 12 and to avoid dispersing the glassmaking material toward the zones of space 12 where hot flue gas stream 5 enters unit 7. Glassmaking material can be fed from all around the upper end of space 21, or from only one region or from more than one regions around the upper end (for instance, along only one or two sides of a rectangular unit).

The glassmaking material is preferably of a size, ranging from small pieces of cullet down to finely divided particulate glassmaking material, such that the glassmaking material is able to flow downwardly under the influence of gravity.

As the glassmaking material passes downward through space 21, its temperature increases by virtue of the flow of heat from the hot combustion products that are in space 21 and passing through space 21. The thus heated glassmaking material exits heat exchange unit 7 as stream 8 which can then be fed to the glassmelting furnace.

Stream 6 of cooled combustion products exits the heat exchange unit 7, for example through upper end 15 in this example, at a temperature of typically 1400° F. or less, although the temperature at this point can be adjusted depending upon the operational characteristics of heat exchange unit 7 and depending on whether the operator wishes to pass this stream to another unit from which additional heat can advantageously be drawn from stream 6, such as another heat exchange unit which passes heat to incoming glassmaking material or to one or more streams of oxidant or fuel to be employed in the combustion that is carried out in glassmaking furnace 3 Heat exchange unit 7 can be constructed of any material that is capable of withstanding the temperatures encountered in the operation described herein. The wall and the upper and lower ends of unit 7 should be made of insulating ceramic materials. The upper end 15 may be flat or sloping as shown in FIG. 2. Nozzle 14 is preferably constructed of ceramic material that can withstand the temperature of the incoming hot combustion product stream.

The efficiency of heat transfer to the descending flow of glassmaking material can be enhanced by providing appropriate baffles such as downwardly concave angle irons disposed in the path of the descending material, to deflect the material from its downward path and to require it to take more time to move along the baffle surfaces, thereby increasing residence time in the space 21 and enhancing heat transfer. An example of heat exchangers using such baffles is described in U.S. Pat. No. 5,992,041.

Figure 3:
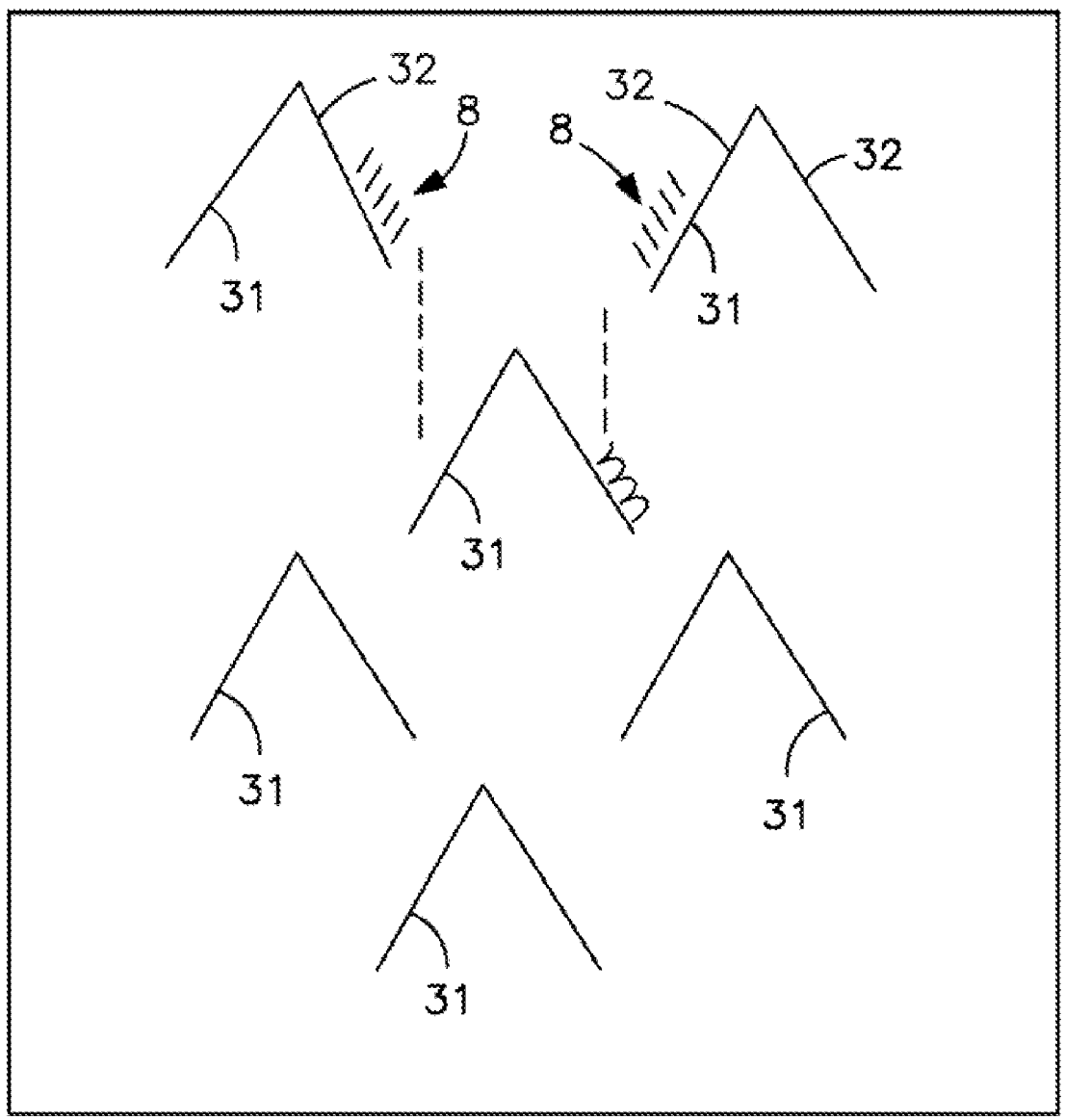
FIG. 3 is a plan view of the interior of the heat transfer space of the present invention, showing a preferred embodiment useful in the practice of the present invention.

FIG. 3 illustrates suitable baffles and suitable location. The view in FIG. 3 is looking at an interior surface of a wall 12, seen from inside space 21. Each baffle 31 protrudes into space 21 from an inner surface of a wall 12. Each baffle 31 has a surface 32 which slopes downwardly so that material impinging on the top of the surface 32 either slides downward on that surface or on other material that has previously landed on that surface, or (less often) caroms off of surface 32 or off of material already on that surface. The baffles are preferably arrayed so that baffles that are adjacent to each other in a given row are spaced apart from each other, thereby permitting glassmaking material to pass between a pair of adjacent baffles, and are arrayed so that material passing through the space that is between a pair of baffles will strike a baffle that is below that space, as shown in FIG. 3. Preferably, a lip 34 is provided that extends a short distance above a surface 32, to help keep material from falling into the interior of space 21 off of the edge of the baffle that is closer to the interior of space 21. Effective heat transfer to the glassmaking material is obtained by also providing that the hot combustion products do not contact the glassmaking material while the temperature of the hot combustion products is at or above the temperature at which the glassmaking material becomes adherent.

Determination of the appropriate temperature at which the present invention is carried out is based on the properties of the mixture of ingredients of the glassmaking materials that are fed through space 21 on their way to the glassmaking furnace. As is known in this field, those ingredients need to contain, or be capable upon application of high temperatures of being converted into, the desired glassmaking components, taking into account the composition of cullet, if any is present, and the composition of all batch components present. Suitable ingredients may include not only the aforementioned compounds but also fining agents and precursors such as (but not limited to) alkali silicates, carbonates, sulfates, nitrates and hydroxides, and alkaline earth metals silicates, carbonates, sulfates, nitrates and hydroxides, as well as hydrates of any of the foregoing. Typical components and ranges of the amounts thereof in various types of glass can be determined from published sources and from routine testing. For illustrative purposes, it can be mentioned that many types of glass may contain 55 wt. % to 85 wt. % silica ($SiO_2$), a total of 4.5 wt. % to 20 wt. % of $Na_2O$ and $K_2O$, a total of 0.05 wt. % to 25 wt. % of CaO and MgO, and 0 to 15 wt. % of $Al_2O_3$, and optionally other components such as $Fe_2O_3$, PbO (used in crystal glass and lead crystal), $B_2O_3$ (in borosilicate glass), and/or compounds that are or that contain oxides of Ti, S, Cr, Zr, Sb and/or Ba.

Lower adherent temperatures (as that term is used herein) are generally associated with higher amounts of alkali and alkaline earth metal oxides, hydroxides, nitrates, carbonates, and sulfates.

For ingredients that become adherent at relatively lower temperatures (such as the ingredients used to make common soda lime glass or borosilicate glass), the temperature should not exceed 1300° F., preferably not exceed 1200° F. Since many different ingredients are used in glass making and the adherent characteristics of glassmaking materials not only depend on the ingredients and moisture content (with lower moisture content being preferred to help resist caking or fusing), but also on their particle size distributions and on the metals used for the baffles or other metals that come in contact with the heated glassmaking material, tests to determine the maximum temperature to avoid sticking problems should be conducted. A recommended test procedure is to heat 250 grams of the glassmaking material, which is in free-flowing particulate form at room temperature, to a given temperature in a metal container (or a crucible) preferably made of the same metal as the baffles that is to come in contact with the heated glassmaking material, and hold the heated material at that temperature for 30 minutes. The heated container is then inverted to assess the flowability characteristics of the material being thus tested. The lowest temperature at which at least 1% of the material adheres to the surface of the container after being subjected to these steps is defined as the "adherent temperature" of the material for the metal used for the container. The temperature of hot combustion products that contact the glassmaking material in unit 7 should not exceed the adherent temperature, and preferably should not exceed 100° F. below the adherent temperature. Satisfying these conditions ensure that glassmaking material will not become so hot that it softens and becomes sticky and then begins to adhere to baffles or plug passageways or openings instead of flowing freely.

These conditions are satisfied for any given set of operating conditions, by providing that the hot combustion products passing through space 21 do not contact the glassmaking material when the combustion products are at a temperature that would cause the glassmaking material to become adherent, while also providing that the heat flux (in units of energy per area of the descending flow of glassmaking material being heated per unit of time) to all of the exposed surface of the glassmaking material remains sufficiently low that the surface of the glassmaking material does not reach or exceed the temperature at which the glassmaking material becomes adherent. The heat flux and temperature distributions can be estimated by radiative and convective heat transfer calculations taking into account, among other things, the incoming temperature and flow rate of the stream of hot combustion products, the temperature and flow rate of the glassmaking material entering heat exchange unit 7, and the geometrical configuration of space 21. Accurate prediction of the temperature distribution, while achievable, is generally difficult and requires an application of a detailed mathematical heat transfer model for optimization.

Thus, a practical way to achieve the practice of the present invention is to provide a sufficiently high surface area of the descending flow of glassmaking material and a sufficiently large space 21 into which the combustion products are fed. The geometry of the space 21 is selected to allow good radiative heat exchange from the hot combustion products without causing the glassmaking material to become adherent.

For example the aspect ratio of a rectangular passageway, defined as the ratio of the vertical length of the passageway to the shorter side of the rectangle, is preferably less than 5 and more preferably less than 3. A preferred method is to introduce the combustion products near the center of the lower end 13 through which nozzle 14 passes so that the distance of even the hottest portion of the combustion products from the heat transfer walls is sufficiently large that the heat flux to the glassmaking material does not become too high that the temperature to which the glassmaking material is exposed becomes too high. Thus, the factors that can most readily be adjusted as determinative in providing operation according to this invention are the total surface area of the descending flow of glassmaking material in space 21, and the distance from the point or points at which the combustion products are hottest as they are fed into the heat exchange unit (typically this is at the nozzle or nozzles 14 when the hot combustion products are fed into the space 21 of the heat exchange unit through one or more nozzles) to the nearest point or points on the surface of the glassmaking material which are exposed to the hot combustion products.

Without intending to be bound by any particular explanation of the efficacy of this invention, it appears that the predominant mode of heat transfer from the combustion products to the glassmaking material is radiative, although some contribution of convective heat transfer always exists. Thus, the calculations that are carried out to determine a heat transfer surface area and suitable location of the inlet nozzle or nozzles are those carried out in the characterization of radiative heat transfer.

The space 21 is configured so that at least a portion of the heat transfer in space 21 from the hot combustion products to the glassmaking material is direct radiative heat transfer, that is, a straight line can be drawn from the combustion products to the glassmaking material which does not pass through any solid barrier such as a wall. In one preferred embodiment, all the radiative heat transfer is direct under this definition.

Figure 4:
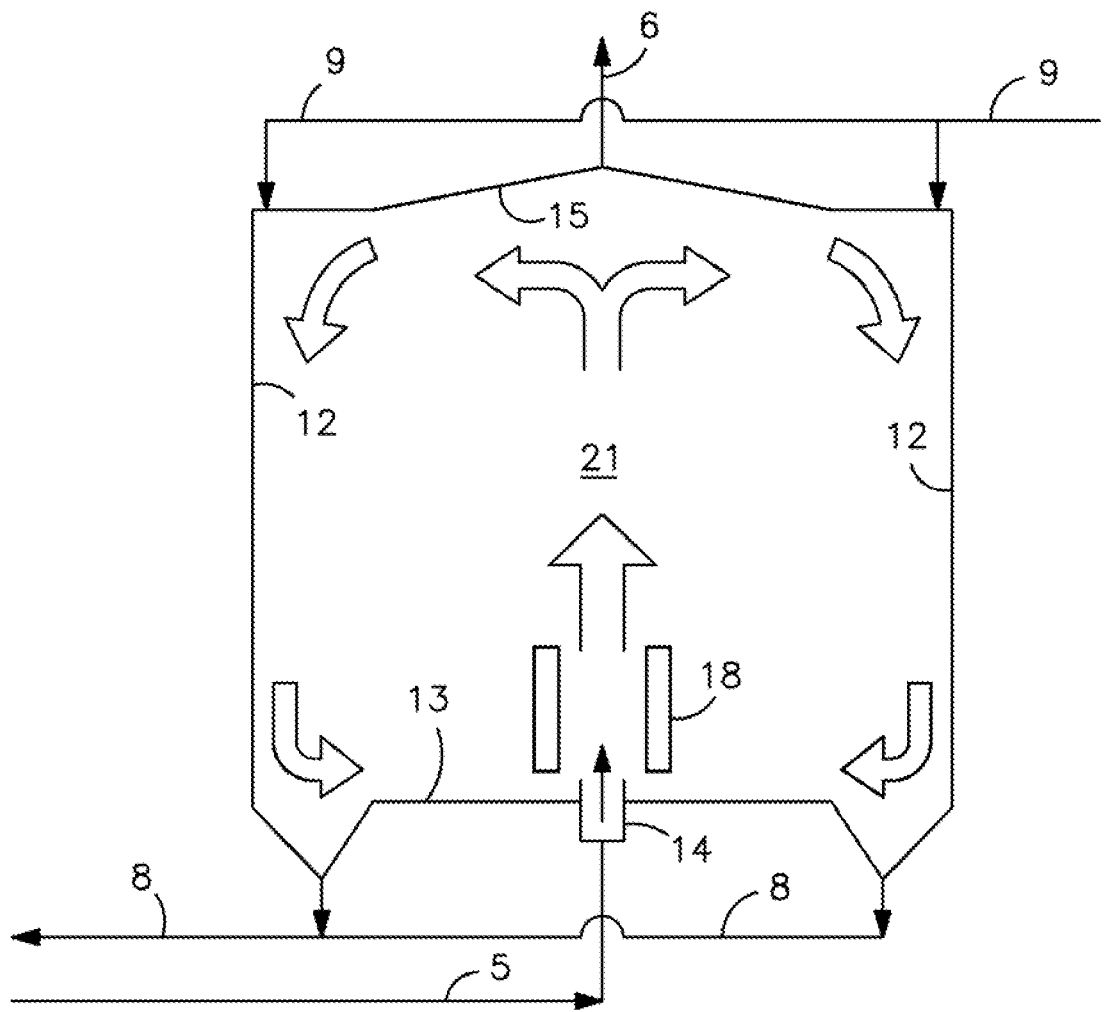
FIG. 4 is a cross-sectional view of an alternative heat exchange unit useful in the practice of the present invention.

FIG. 4 illustrates another preferred embodiment of the present invention. FIG. 4 depicts the embodiment of FIG. 2, but to which has been added shadow wall 18. Shadow wall 18 is located between inlet nozzle 14 and the descending flow of glassmaking material. Shadow wall 18 extends from at or near the lower end 13, upwards into space 21. It does not extend the full distance to the upper end 15. Thus, even when a shadow wall 18 is present, there remains a region in space 21 where there is no barrier between the combustion products and the surface of the descending glassmaking material, so that direct radiative heat transfer can occur. The shadow wall 18 is made of suitable refractory material, such as high-temperature-tolerant ceramic materials, that can withstand the temperature of the incoming hot combustion product stream. Shadow wall 18 preferably has openings through it to only partially pass radiative heat flux from the hot combustion product stream toward the descending flow of glassmaking material, thus reducing the radiative heat flux in a controlled fashion. The openings can be circular or polygonal, or can be in the form of elongated slots. Generally, the openings can occupy from 10% to 90% of the surface of the shadow wall; the particular percentage can readily be determined experimentally. The openings can be uniformly spaced on the surface of the shadow wall, or one may provide fewer openings nearer to the bottom (i.e. nearer to the point where the hot combustion products enter the passageway) and more openings further from the bottom. Shadow wall 18 may also absorb heat from the hot combustion products, and reradiate the heat toward the surface of the glassmaking material. Shadow wall 18 enables the operator to reduce the overall size of heat exchange unit 7 by reducing the heat flux from the hottest region of the space 21 through which the combustion products are flowing, which is usually the region closest to where the hot combustion products enter space 21. The effective dimensions of a shadow wall 18, especially the number of openings and their dimensions, can readily be determined experimentally.

In another preferred embodiment, shadow wall 18 has no openings through its sides, so that it functions as a conduit bringing gaseous combustion products into space 21.

Referring again to FIG. 4, the arrows that appear therein illustrate that use of shadow wall 18 enables establishing a flow pattern of the hot combustion products within space 21 in which the hot combustion products upon first entering space 21 flow upwardly, radiatively transferring heat to the descending glassmaking material, and then are drawn downwardly through a region that is closer to the glassmaking material so that further radiative or convective heat transfer can occur. Thus, cocurrent flow of the combustion products relative to the flow of the glassmaking material occurs along the surface of the glassmaking material. The combustion products are then drawn through spaces or openings at the base of shadow wall 18, by the incoming stream of hot combustion products, thereby providing the driving force for this cycling flow pattern that is illustrated by the arrows. Since the cocurrent flow of the combustion products has been cooled by heat transfer to the glass making material, mixing it into the incoming stream of hot combustion products helps to reduce the gas temperature of flowing out of the shadow wall.

The heated glassmaking material must be conveyed to a charger(s) of the glass furnace without losing significant heat to the surrounding. A preferred way is to locate unit 7 near a charger and at a height above the charge level and use a insulated chute for gravity feeding. Other preferred methods include a screw conveyor and a vibrating tray conveyor.

As noted above, one significant advantage of the present invention is that more of the energy content of the hot combustion products can be used to advantage, even though its temperature is higher as being obtained from oxy-fuel combustion, without requiring any significant reduction in the temperature of the stream (prior to its entry into the heat exchange unit 7) such as by adding a diluent fluid stream.

The fact that the present invention can take advantage of an incoming combustion product stream having a higher temperature than prior practice thought could be employed to heat incoming glassmaking material also means that the temperature of the combustion product stream can still be high enough that this stream can be used for additional heat exchange, within space 21 or after it exits space 21. That is, heat exchange can occur within space 21 by direct contact of the combustion products with the glassmaking material provided that the combustion products are not so hot that the glassmaking material becomes adherent. As another example, combustion product stream 6 can be fed to a conventional heat exchanger that exchanges heat from a combustion product stream having a temperature on the order of 1000° F. or less, by indirect convective heat exchange with incoming glassmaking material, or with oxidant or fuel to be subsequently combusted in the glassmelting furnace, or with other gaseous, liquid or solid material. As a further advantageous embodiment, the glassmaking material that is fed as stream 9 can have already been heated, for instance by passage through such a conventional convective heat exchange unit, before it is fed as stream 9 to the heat exchange unit described herein. The heat exchange can be with cooled but still heat-bearing combustion products, or with a stream of other hot material.

The stream of cooled combustion products emerging from heat transfer unit 7, or from a subsequent heat exchanger, can if desired be subjected to treatment steps that may be desirable or necessary before the stream is discharged to the atmosphere or employed as a feed stream to a chemical processing stage. For instance, the stream can be passed through an electrostatic precipitator or equivalent apparatus to remove fine particulate contaminants. The stream can be treated to remove gaseous atmospheric pollutants such as sulfur oxides, such as by contacting the stream with a suitable absorbent or reactant such as $Ca(OH)_2$ or sodium carbonate.

What is claimed is:

1. A glassmelting method comprising
   (A) passing heated glassmaking material into a glassmelting furnace;
   (B) combusting fuel with gaseous oxidant having an overall average oxygen content of at least 20.9 vol. % oxygen to produce heat for melting said heated glassmaking material in said glassmelting furnace and produce hot combustion products having a temperature greater than 2000° F.;
   (C) providing a heat exchange unit comprising a lower end, an upper end, and sides enclosing a heat transfer space between said upper and lower ends;
   (D) feeding glassmaking material into said heat exchange unit so that said glassmaking material descends along the inner surface of a side of said heat exchange unit;
   (E) withdrawing said hot combustion products from said glassmelting furnace and feeding said hot combustion products into said heat exchange unit, wherein the temperature of said hot combustion products entering said heat exchange unit is at least 2000° F., and flowing said hot combustion products through said heat transfer space and out of said heat exchange unit,
   wherein said hot combustion products heat said glassmaking material in said unit by radiative heat exchange at least part of which is direct radiative heat exchange,
   wherein said hot combustion products do not contact said glassmaking material within said heat transfer space while they are at a temperature at which the glassmaking material would become adherent if it contacts said hot combustion products, and
   (F) providing glassmaking material heated in step (E) as the heated glassmaking material that is passed to the furnace in step (A).

2. A method according to claim 1 wherein the hot combustion products fed in step (E) into said lower end of said heat exchange unit have a temperature of at least 2200° F.

3. A method according to claim 1 wherein the oxidant combusted in step (B) has an overall average oxygen content of at least 35 vol. % oxygen.

4. A method according to claim 1 wherein the oxidant combusted in step (B) has an overall average oxygen content of at least 90 vol. % oxygen.

5. A method according to claim 1 wherein said heat exchange unit comprises a shadow wall that reduces the direct radiative heat transfer from said hot combustion products to said glassmaking material.

6. A method according to claim 1 wherein before said glassmaking material is fed into said upper end of said heat exchange unit it is heated in another heat exchanger by direct or indirect heat exchange.

7. A method according to claim 1 wherein said combustion products after flowing out of said heat transfer space are cooled in another heat exchanger by direct or indirect heat exchange.

8. A method according to claim 1 wherein said hot combustion products are flowed out of said heat exchange unit into a heat exchanger in which heat is transferred by direct or indirect heat exchange to glassmaking material which is then fed as glassmaking material fed in step (D).

9. A method according to claim 1 wherein said heat exchange unit further comprises one or more passageways outside said heat transfer space, and at least a conduit to receive hot combustion products from said space and to convey said received hot combustion products through and out of one or more of said passageways, the method further comprising feeding additional glassmaking material, in addition to glassmaking material fed in step (D), through said one or more passageways and heating it therein by direct or indirect heat exchange from said hot combustion products, and providing said heated additional glassmaking material with the glassmaking material heated in step (E) as the heated glassmaking material passed in step (A) into a glassmelting furnace.

10. A method according to claim 1 wherein said glassmaking material that is fed in step (D) becomes adherent at a temperature of 1800° F. or higher.

* * * * *